United States Patent
Murray et al.

(10) Patent No.: US 10,483,710 B2
(45) Date of Patent: Nov. 19, 2019

(54) MULTILAYER ELECTRODE ASSEMBLY (71) Applicant: Auroma Technologies, Co., LLC, Everett, WA (US)

(72) Inventors: Michael W. Murray, Mukilteo, WA (US); Thomas Wolowiec, Everett, WA (US)

(73) Assignee: AUROMA TECHNOLOGIES, CO., LLC, Everett, WA (US)

( * ) Notice: Subject to any disclaimer, the term of this patent is extended or adjusted under 35 U.S.C. 154(b) by 0 days.

(21) Appl. No.: 16/034,168

(22) Filed: Jul. 12, 2018

(65) Prior Publication Data

US 2019/0020168 A1 Jan. 17, 2019

Related U.S. Application Data (60) Provisional application No. 62/532,310, filed on Jul. 13, 2017.

(51) Int. Cl.
*H01S 3/03* (2006.01)
*H01S 3/038* (2006.01)
(Continued)

(52) U.S. Cl.
CPC ............ *H01S 3/0385* (2013.01); *H01S 3/034* (2013.01); *H01S 3/036* (2013.01); *H01S 3/038* (2013.01); *H01S 3/0326* (2013.01); *H01S 3/0388* (2013.01); *H01S 3/032* (2013.01); *H01S 3/041* (2013.01); *H01S 3/073* (2013.01);
(Continued)

(58) Field of Classification Search
CPC ...... H01S 3/038; H01S 3/0971; H01S 3/2232; H01S 3/0385; H01S 3/0326
See application file for complete search history.

(56) References Cited

U.S. PATENT DOCUMENTS 6,195,379 B1 * 2/2001 Jones ................... H01S 3/0315
372/64
6,818,193 B2 * 11/2004 Christodoulatos ... H05H 1/2406
204/157.3
(Continued)

OTHER PUBLICATIONS

Author unknown; International Search Report and Written Opinion of PCT/US2018/41883; dated Nov. 23, 2018 15 pgs.

*Primary Examiner* — Kinam Park
(74) *Attorney, Agent, or Firm* — K&L Gates LLP (57) ABSTRACT

Systems and techniques for multilayer electrode assemblies are generally described. In some examples, a multilayer electrode assembly may comprise a first dielectric material. In some examples, the first dielectric material may be shaped so as to form a channel defined by an interior surface. In various examples the multilayer electrode assemblies may comprise a first metal layer disposed adjacent to a first portion of the exterior surface of the first dielectric material. In various further examples, the multilayer electrode assemblies may comprise a second metal layer disposed adjacent to a second portion of the exterior surface of the first dielectric material. In some examples, the first metal layer may be disposed in a first spaced relationship with the second metal layer. In various examples, a substantially uniform electric field may be generated in the channel of the first dielectric material when a voltage is applied to the multilayer electrode assembly.

24 Claims, 7 Drawing Sheets

(51) Int. Cl.
*H01S 3/036* (2006.01)
*H01S 3/034* (2006.01)
*H01S 3/032* (2006.01)
H01S 3/0971 (2006.01)
H01S 3/223 (2006.01)
H01S 3/07 (2006.01)
H01S 3/0975 (2006.01)
H01S 3/041 (2006.01)

(52) U.S. Cl.
CPC .......... *H01S 3/0971* (2013.01); *H01S 3/0975* (2013.01); *H01S 3/2232* (2013.01)

(56) References Cited

U.S. PATENT DOCUMENTS

| | | | |
|---|---|---|---|
| 6,897,508 B2 * | 5/2005 | Sneh | H01L 27/10861 |
| | | | 257/301 |
| 2002/0061045 A1 * | 5/2002 | Zhang | H01S 3/03 |
| | | | 372/61 |
| 2003/0101936 A1 * | 6/2003 | Lee | H05H 1/2406 |
| | | | 118/723 E |
| 2007/0133643 A1 | 6/2007 | Seguin | |

* cited by examiner

MULTILAYER ELECTRODE ASSEMBLY

CROSS-REFERENCE TO RELATED APPLICATIONS

This application claims the benefit of U.S. Provisional Application No. 62/532,310, filed Jul. 13, 2017, the disclosure of which is incorporated herein by reference in its entirety.

FIELD

This application relates generally to electrode assemblies, and more specifically, to electrode assemblies for generating uniform electric fields, such as in molecular gas lasers.

BACKGROUND

Uniform excitation of laser gas is of particular importance in the case of molecular gas lasers such as $CO_2$ and CO lasers where over pumping can lead to localized degradation of optical gain in the gas. In addition, electrically pumped gas lasers in general may suffer from instabilities that form under high pulse energy conditions. Electrical discharge instabilities may lead to intense arc discharges which may damage the laser electrodes or at the very least render the optical quality of the gas discharge gain medium useless for producing a high mode quality laser beam. High initial gas discharge uniformity may be used in pulsed, high energy, gas lasers to increase the amount of energy that may be deposited into the gas before the inevitable onset of gas discharge instabilities.

Traditionally, gas lasers have been operated in continuous wave (cw) mode at low gas pressures (about 10 to 100 torr) or as pulsed lasers at high gas pressures (about 300 to 760 torr). At low gas pressures, gas lasers typically have small transverse gas discharge dimensions (about 1 to 4 mm) to produce some degree of discharge uniformity by relying on high rates of ambipolar diffusion in the laser plasma. In addition, extra helium is added to the gas mixtures of low pressure gas lasers to improve discharge uniformity by further enhancing ambipolar diffusion. At high gas pressures, gas lasers usually have transverse discharge dimensions that are too large to allow ambipolar diffusion to be practical. High pressure gas lasers have traditionally used specially profiled electrodes to achieve very good uniform electric field conditions where the gas discharges occur.

Profiled electrodes typically utilize a central region with a flat, parallel, electrode geometry in conjunction with profiled electrode regions chosen to gradually reduce the electric field strength on both sides of the central region while introducing only a minimal amount of electric field distortion in the central region. The gas discharge in a profiled electrode assembly is usually confined to the central region and will have either a square or rectangular cross-section. Unfortunately, the lowest order optical mode of a laser will most likely have a cross-section that is either circular or elliptical and is not a good match for the discharge cross-section of a profiled electrode assembly. About 20% of the energy deposited into the gas discharge of the profiled electrode assembly will not be in the optical cavity of the laser and will be wasted.

Rather than flat electrodes which waste energy, curved electrodes can be used around a cylindrical cross-section. The resulting electric field will fill the optical mode cross-section but unfortunately will be non-uniform. At high gas pressure the RF current flowing through the laser gas of the curved electrode assembly will be focused on both sides of the optical mode cross-section and largely bypass the gas in the center of the electrode assembly. The non-uniformity of the field will also reduce the efficiency of the laser assembly.

SUMMARY

Systems and methods are provided for multilayer electrode assemblies.

In accordance with embodiments of the present disclosure, multilayer electrode assemblies are generally described. In various examples, multilayer electrode assemblies may comprise a first dielectric material having an exterior surface and an interior surface. The first dielectric material may be shaped so as to form a channel defined by the interior surface. In various further examples, the multilayer electrode assemblies may comprise a first metal layer disposed adjacent to a first portion of the exterior surface of the first dielectric material. In some further examples, the multilayer electrode assemblies may comprise a second metal layer disposed adjacent to a second portion of the exterior surface of the first dielectric material. In some examples, the first metal layer may be disposed in a first spaced relationship with the second metal layer. In various further examples, a uniform electric field may be generated in the channel of the first dielectric material when a voltage is applied to the multilayer electrode assembly by a drive electrode. As used herein, a "substantially" uniform electric field refers to an electric field that is at least 85% uniform.

Still other embodiments of the present disclosure will become readily apparent to those skilled in the art from the following detailed description, wherein are described embodiments by way of illustrating the best mode contemplated for carrying out the various techniques described herein. As will be realized, various embodiments may be capable of other and different implementations and the various details described herein are capable of modifications in various respects, all without departing from the spirit and the scope of the present disclosure. Accordingly, the drawings and detailed description are to be regarded as illustrative in nature and not as restrictive.

DETAILED DESCRIPTION

In the following description, reference is made to the accompanying drawings that illustrate several embodiments of the present disclosure. It is to be understood that other embodiments may be utilized and system or process changes may be made without departing from the spirit and scope of the present disclosure. The following detailed description is not to be taken in a limiting sense, and the scope of the embodiments of the present disclosure is defined only by the claims of the issued patent. It is to be understood that drawings are not necessarily drawn to scale.

Various embodiments of the present disclosure provide improved systems and methods for uniform electric field in a channel of a multilayer electrode assembly. These embodiments may provide a uniform electric field in the optical mode volume of a high quality gas laser system or in other systems requiring and/or benefiting from a uniform electric field. Additionally, the various techniques described herein overcome various technical challenges presented when laser gas channels are formed in cylindrical, tube-like, and/or non-rectangular/non-parallelepiped shapes and/or geometries. A uniform electric field may refer to an electric field that that has the same electric field intensity (both in terms of magnitude and direction) at any two points within the electric field. Electric fields may have varying degrees of uniformity, for example, an electric field that is 95% uniform may have the same electric field intensity throughout 95% of the volume of space in which the electric field exists.

Electric field uniformity may be measured as described herein. In various examples, any finite element analysis (FEA) software capable of simulating electrostatic fields may be used in accordance with the following techniques. For example, COMSOL Multiphysics may be used to determine the uniformity of an electrostatic field inside a region of interest (ROI). In various examples, it is important to pick an element size that can accurately take into account boundary transitions and fringe effects. Additionally, for the following methods, it is assumed that the length of the electrode is long enough that most of the electric field inside of the gain medium can be considered to be unchanged along the bore axis (e.g., inside the laser gas channel). A two dimensional model of the electrode assembly and the laser gas channel (e.g., the ceramic tube) may be created in the FEA simulation software. The appropriate dielectric properties may be input in the FEA simulation software for the different regions of the assembly, as described in further detail below. Voltage potentials are applied at the appropriate locations in the simulation. The FEA simulation software may then calculate the electric field inside the laser gas discharge bore (e.g., inside the ceramic tube or other laser gas channel).

The magnitude of the electric field in the X and Y axis (with the Z axis being along the laser gas channel) is calculated for each data point. The maximum value of the magnitude of the electric field from this data set is determined. The data set is divided by the maximum value (e.g., the data set is normalized). The minimum value of the normalized data set is the uniformity. For example, if the lowest value is 50% of the maximum value, the uniformity of the electric field in the discharge region can be considered to be 50%. The electric discharge happens at the highest points. Having large differences in magnitude in the laser gas discharge region causes a non-uniform discharge. Accordingly, it is beneficial to maximize the uniformity of the electric field within the laser gas discharge region (e.g., within channel 3).

Figure 1:
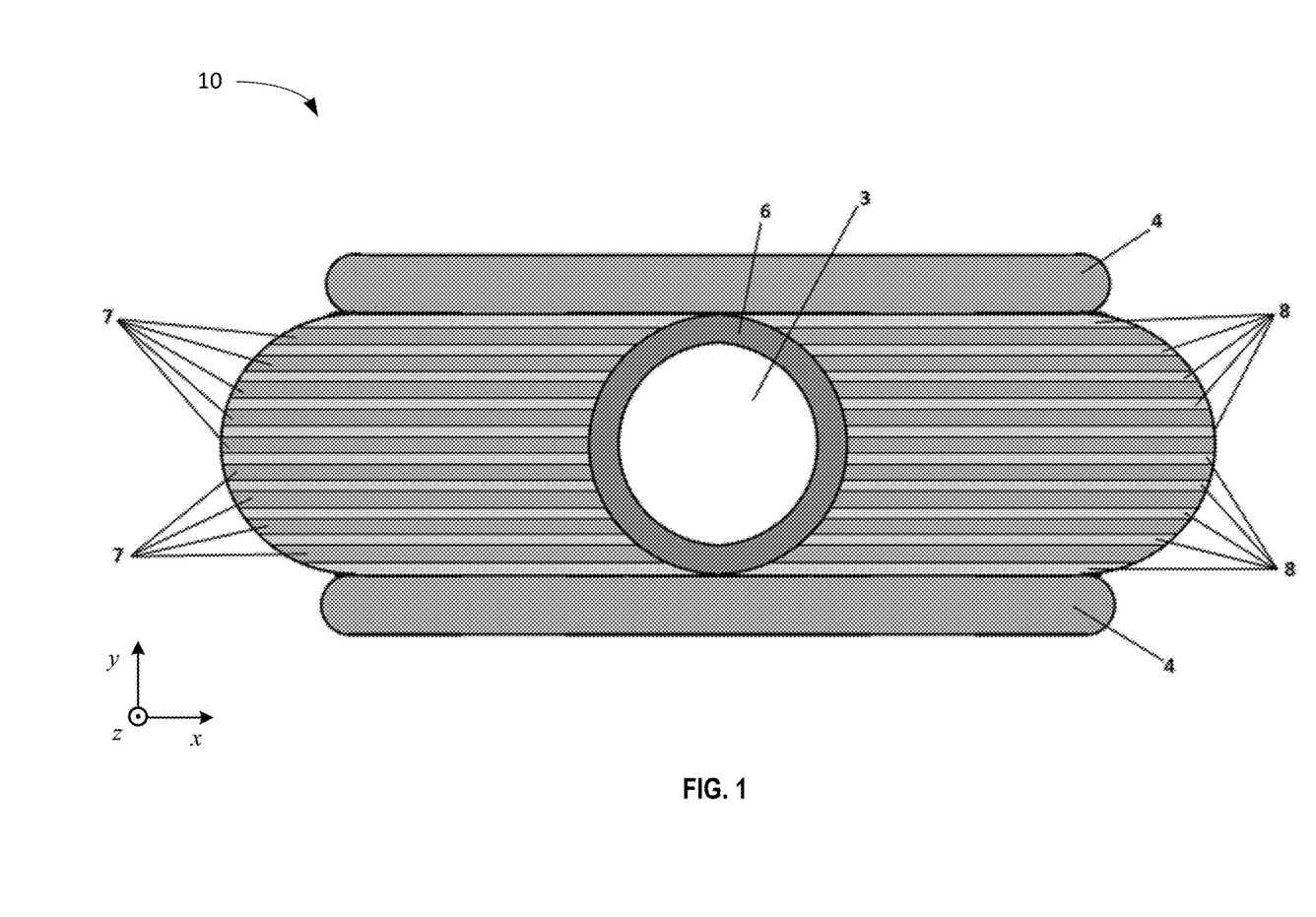
FIG. 1 depicts a cross-sectional view of a multilayer electrode assembly in accordance with various aspects of the present disclosure.

FIG. 1 depicts a cross-sectional view of a multilayer electrode assembly 10 in accordance with various embodiments of the present disclosure. In various examples, multilayer electrode assembly 10 may achieve a high degree of electric field uniformity throughout the volume of a channel 3 formed from a dielectric material 6 or throughout the bulk of the volume of channel 3. In various examples, the uniformity of the electric field generated in the interior of the channel 3 may be greater than 80%, greater than 90%, greater than 95%, etc. In some examples, the uniformity of the electric field generated in the interior of channel 3 may depend on various parameters, such as the number of layers used, the geometry of the various components (e.g., edges of layers, shape of channel cross section and dielectric material 6 cross section), the relative thickness of the layers, the shape of the edges of the layers disposed adjacent to dielectric material 6, etc.

In some examples, multilayer electrode assembly 10 may be used to generate a high degree of electric field uniformity throughout channel 3 for the lowest order optical mode of a gas laser while greatly enhancing the flow of heat out of the gas located in channel 3. Multilayer electrode assembly 10 may achieve enhanced heat flow by introducing multiple layers of thermally conductive metal and dielectric material to surround dielectric material 6 and channel 3. For example, multilayer electrode assembly 10 may be effective to transfer heat from the gas in the optical mode volume of a laser. The alternating layers of metal and dielectric material impose boundary conditions that may produce a close approximation to a uniform electric field in the optical mode volume of the laser. FIG. 1 depicts a multilayer electrode assembly 10 illustrating the use of nine metal layers 7 interleaved with ten dielectric layers 8. While the nine metal layers 7 and ten dielectric layers 8 are depicted in FIG. 1 for illustrative purposes, it should be appreciated that a variety of different numbers and configurations of metal layers 7 and dielectric layers 8 may be used in accordance with various aspects and embodiments of the present disclosure. Additionally, in at least some examples, one or more of the metal layers 7 and/or dielectric layers 8 may be non-parallel to one another. For example, in at least some embodiments, metal layers 7 may be radially disposed on an exterior surface of dielectric material 6. The metal layers 7 may be positioned in close thermal contact with the outside of dielectric material 6 so as to conduct heat away from dielectric material 6. The material of the dielectric layers 8 functions to electrically insulate the metal layers 7 from each other. As depicted in FIG. 1, in some examples, dielectric material 6 may form a tube-like structure with an elliptical or circular cross section. In various examples where dielectric material 6 is formed in a cylindrical, circular or tube-like shape, distal ends of metal layers 7 (e.g., the ends of metal layers 7 that are located distal to dielectric material 6) may extend different distances from a center point of the channel 3 relative to one another due to the curved geometry of dielectric material 6.

Figure 2:
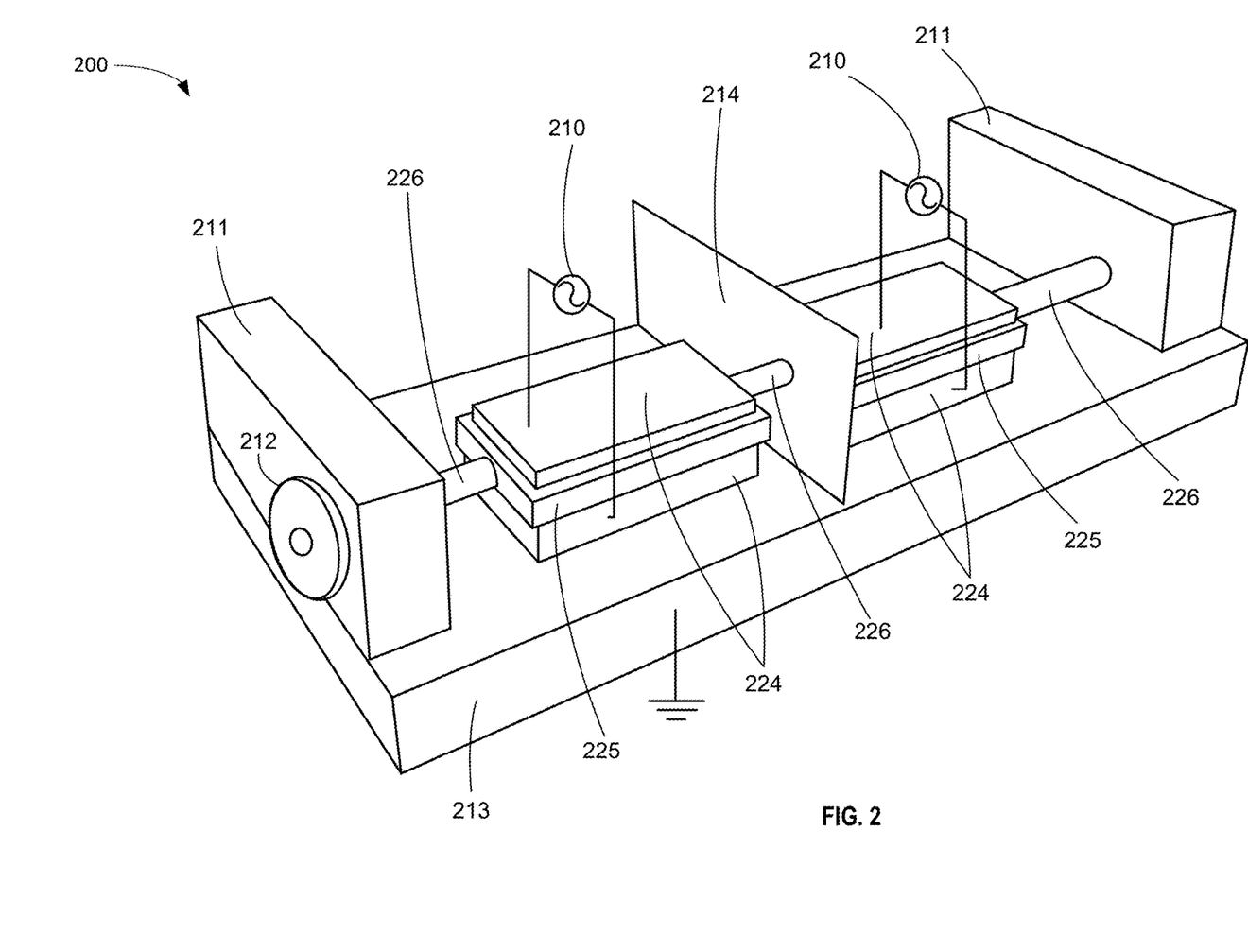
FIG. 2 depicts a perspective view of a laser system comprising one or more multilayer electrode assemblies, in accordance with various embodiments of the present disclosure.

FIG. 2 depicts a perspective view of a laser system 200, in accordance with various embodiments of the present disclosure. The laser system 200 utilizes two multilayer electrode assemblies which share a dielectric tube 226. For illustrative purposes, FIG. 2 depicts only two multilayer electrode assemblies, but it is understood that any number of multilayer electrode assemblies can be used.

The multilayer electrode assemblies of laser system 200 may include metal electrodes 224 which are on opposite sides of a stack 225 of alternating dielectric layers and metal layers. In various examples, the dielectric layers of stack 225 may be replaced by capacitors and/or by empty space. The dielectric tube 226 can be considered a portion of the multilayer electrode assemblies. In various examples, the dielectric tube 226 may comprise ceramic and/or other dielectric materials. In various other embodiments and as described in further detail below, instead of stack 225, the multilayer electrode assemblies may comprise non-uniformly spaced metal plates radially positioned around dielectric tube 226. Additionally, in various other embodiments instead of a dielectric tube 226 a dielectric material of a different geometry may be used. For example, a parallel-epiped structure defining an interior channel may be used.

In some examples, the metal electrodes 224 of the multilayer electrode assemblies may be flat. In some examples, the metal electrodes 224 may be shorter than the stack 225. The stack 225 of alternating dielectric layers and metal layers may generally be longer than the metal electrodes 224 by a dimension of at least half the diameter of the dielectric tube 226 on each end of the dielectric electrode assembly. By extending the stack 225 beyond the ends of the metal electrodes 224, electric field distortion at the ends of the dielectric electrode assemblies may be minimized and the electrical breakdown path between the metal electrodes 224 may be extended. The stack 225 may also be wider than the metal electrodes 224 to extend the electrical breakdown path between the metal electrodes 224 on each side of the dielectric electrode assemblies as well.

A high degree of electric field uniformity (e.g., greater than or equal to 90% uniformity) may be generated in the bulk of the discharge volume of dielectric tube 226. To minimize non-uniformity of the electric field, the dielectric layers of stack 225 may be extended beyond the ends of the metal electrodes 224. In some examples, stack 225 may be fabricated as multi-layer printed circuit broads (PCB), with the edges of the metal layers of stack 225 embedded in dielectric material. On the ends of the multi-layer PCB structure the dielectric material serves to gradually reduce the electric field. Additionally, the dielectric material of the PCB structure may be extended beyond the edges of the metal layers laterally (e.g., in a direction perpendicular to the long axis of dielectric tube 226). The lateral extension of the dielectric material of the PCB structure serves as potting to prevent electrical breakdown between the lateral edges of the metal electrodes 224.

The multilayer electrode assemblies may be energized by power sources 210 which can be time varying in nature. The power sources 210 may be radio frequency (RF) sine wave sources or consist of square pulses with fast rising and/or falling edges, for example.

In some examples, a laser device including one or more of the multilayer electrode assemblies described herein may be used in a dental laser used in hard tissue applications. In such examples, average power provided by power sources 210 may be less than about 1 watt, for safety. In such applications, peak power of power sources 210 may vary from about 500 watts up to about 2000 watts. In various other examples, a laser device including one or more of the multilayer electrode assemblies described herein may be used in other medical applications, such as the cutting and/or drilling of bone. In such examples, the power sources 210 may provide higher average and peak powers. For example, power sources 210 may provide average power of around 10-50 watts and peak powers of higher than about 5 kilowatts.

In some further examples, a laser device including one or more of the multilayer electrode assemblies described herein may be used in soft tissue applications (e.g., in a soft tissue $CO_2$ medical laser). The multilayer electrode assemblies described herein, when incorporated into a soft tissue medical laser may allow for shorter optical pulses at high enough peak power to produce scalpel-equivalent cutting performance (e.g., resulting in a relatively short healing time of about one day) for soft tissues. Additionally, various other medical applications not described herein are possible. The average and peak power of various medical lasers incorporating the multilayer electrode assemblies described herein may be configured according to the desired application. Additionally, in various other examples the metal electrode assemblies described herein may be used in other non-medical laser devices and/or in other non-laser devices where generation of a highly uniform electric field is beneficial.

One of the metal electrodes 224, adjacent to a frame 213 of the laser assembly 200, for one or both of the multilayer electrode assemblies, may be electrically connected to the frame 213 of the laser assembly 200. As another example, the metal electrodes 224 may be electrically isolated from the frame 213 of the laser assembly 200. Because it may be desirable to operate the power sources 210 independently, a metal partition 214 may be located between the dielectric electrode assemblies to act as an electrical shield. The metal partition 214 can have a small aperture just large enough to allow the dielectric tube 226 to pass through the metal partition 214 while keeping a minimum amount of electrical energy from coupling between the multilayer electrode assemblies. The ends of the dielectric tube 226 are connected to laser mirror mounts 211 by gas tight seals. The laser mirror mounts 211 provide an unobstructed optical path between the ends of dielectric tube 226 and laser mirrors 212. Only one of the laser mirrors 212 is shown for clarity. Although only one laser mirror 212 is visible in the diagram depicted in FIG. 2, it should be appreciated that the laser mirrors 212 are mounted to be perpendicular to the axis of the dielectric tube 226 on the face of the laser mirror mounts 211. The laser mirror mounts 211 are mounted on the frame 213 of the laser assembly 200 to rigidly hold the laser mirrors 212 in a fixed position relative to each other.

Instead of the multilayer electrode assemblies depicted and described herein, other electrode assemblies may use profiled electrodes for high pressure gas lasers (e.g., lasers where the gas pressure inside the discharge region is from about 100 torr to about 300 torr and/or from about 300 torr to about 760 torr). In other examples, electrode assemblies may use profiled electrodes for gas lasers with gas pressure inside the discharge region from about 10 torr to about 300 torr. Use of the term "about" herein may refer to a tolerance of about +/−1%, 5%, or 10% from the stated value or range of values, in various embodiments. Profiled electrodes typically utilize a central flat region with a flat, parallel, electrode geometry in conjunction with profiled electrode edge regions to the sides of the flat central regions. This electrode shape is generally chosen to gradually reduce the electric field strength on both sides of the central region (i.e., the region between the flat portions of the electrodes) while introducing only a minimal amount of electric field distortion in the central region. Gas discharge in a profiled electrode assembly is typically confined to the central region between the flat portions of the electrode, and accordingly will have either a square or rectangular cross-section. Unfortunately, the lowest order optical mode of a laser will most likely have a cross-section that is either circular or elliptical and is therefore not a good match for the discharge cross-section of a profiled electrode assembly. Accordingly, if a profiled electrode assembly is used with a laser having a circular or elliptical cross section, about 20% of the energy deposited into the gas discharge of the profiled electrode assembly will not be in the optical cavity of the laser and will be wasted.

Alternatively, instead of the multilayer electrode assemblies depicted and described herein, electrodes may be shaped so as to conform to the outer surfaces of a dielectric channel (e.g., a ceramic tube or other laser gas channel). Accordingly, in an example, an upper and lower electrode 5 may be curved around the upper and lower outer surface of a dielectric tube. If such an electrode geometry is used in a low pressure gas laser operated in continuous wave mode and excited by a radio frequency (RF) voltage applied to external metal electrodes, the resulting electric field will fill the interior of the dielectric tube between the electrodes but will be non-uniform. If such an electrode geometry is used at high gas pressure the RF current flowing through the laser gas of the electrode assembly will tend to be focused on both sides of the interior of the dielectric tube and will largely bypass the gas in the center of the dielectric tube. Moreover, the process of manufacturing these precisely shaped electrodes can be complicated and expensive.

Another example of an electrode assembly that produces a uniform gas discharge with a cross-section that matches the cross-section of the lowest order mode of a laser may comprise a pair of flat parallel metal electrodes separated by a dielectric material that embeds a dielectric tube. A uniform electric field will exist in the optical mode volume of a cross-section of the dielectric tube of the laser if a specific value of the relative dielectric constant is chosen for the electrode assembly. The specific value of the dielectric constant for the electrode assembly depends on the dielectric constant of the dielectric tube as well as the inner and outer diameters of the dielectric tube.

Referring again to FIG. 1, unlike the previously described electrode assemblies in which a dielectric material having a particular dielectric characteristic is chosen to produce a uniform electric field in the laser gas channel, the material of the dielectric layers 8 of multilayer electrode assembly 10 can have a relative dielectric constant of any desired value while achieving a high degree of electric field uniformity throughout the channel 3 of the dielectric material 6. Furthermore, in addition to the thermal conductivity of the metal layers 7, the material of the dielectric layers 8 may be chosen to have the highest possible thermal conductivity regardless of relative dielectric constant, further improving the thermal conductivity of multilayer electrode assembly 10. However, in the design of multilayer electrode assembly 10, a uniform voltage drop is provided across each dielectric layer 8 when the metal layers 7 are uniformly spaced in the y dimension (e.g., the dimension running perpendicular to the plane of the electrodes 4). Thus the capacitance between any adjacent pair of metal layers 7 is a constant value when the metal layers 7 are uniformly spaced in the y dimension. Additionally, the capacitance between any adjacent pair of metal layers 7 may be equal to the capacitance between any other adjacent pair of metal layers 7, within a tolerance of +/−0.1%+/−1%, +/−2%, +/−3% 10%, or some other suitable tolerance. Accordingly, multilayer electrode assembly 10 in FIG. 1 is drawn such that the width (in the x direction) of each of the metal layers 7 is equal to insure the capacitance between each pair of metal layers 7 is equal. As a result each side of multilayer electrode assembly 10 has a round contour of roughly the same shape as the outside contour of the tube-shaped dielectric material 6. In some other examples, the dielectric material 6 may be formed in such a way to form a channel of a different geometry (e.g., elliptical, rectangular, square, polygonal, etc.).

The electrodes 4 of multilayer electrode assembly 10 are depicted with rounded edges to suppress corona discharges when very high voltages are applied between the electrodes 4. In some examples an electrode 4 may be supplied with a voltage to generate the uniform electric field in the channel 3. In such a case the electrode 4 may be referred to as a "drive electrode." In some other examples, the electrodes 4 may be designed with other shapes apart from what is shown in FIG. 1. For example, the electrodes 4 may be designed with sharp corners without causing any electric field perturbation inside the dielectric material 6 if corona discharge is not an issue. As previously described, it should be noted that the choice for the number of metal and dielectric layers used in the construction of a multilayer metal electrode assembly of the present disclosure may vary. Using a large number of layers may have the advantage of making the voltage distribution in channel 3 of dielectric material 6 more uniform as well as providing for better thermal conductivity. However, using too many layers may not be practical in terms of cost and ease of fabrication. Fortunately, the wall thickness of dielectric material 6 can be made large enough so regions of high electric field will only occur inside the channel 3 of dielectric material 6. Accordingly, electric field will be uniform (e.g., may have a uniformity of greater than or equal to 90%) in the gas contained within channel 3 of dielectric material 6.

Another variable aspect in the design of a multilayer metal electrode assembly of the present disclosure is the choice of the relative thickness of the metal layers 7 versus the dielectric layers 8. To enhance cooling it may be desirable to make the metal layers 7 as thick as possible. However, the dielectric layers 8 should be at least thick enough to keep the electric field strength below the voltage breakdown limit of the material of dielectric layers 8.

Figure 3:
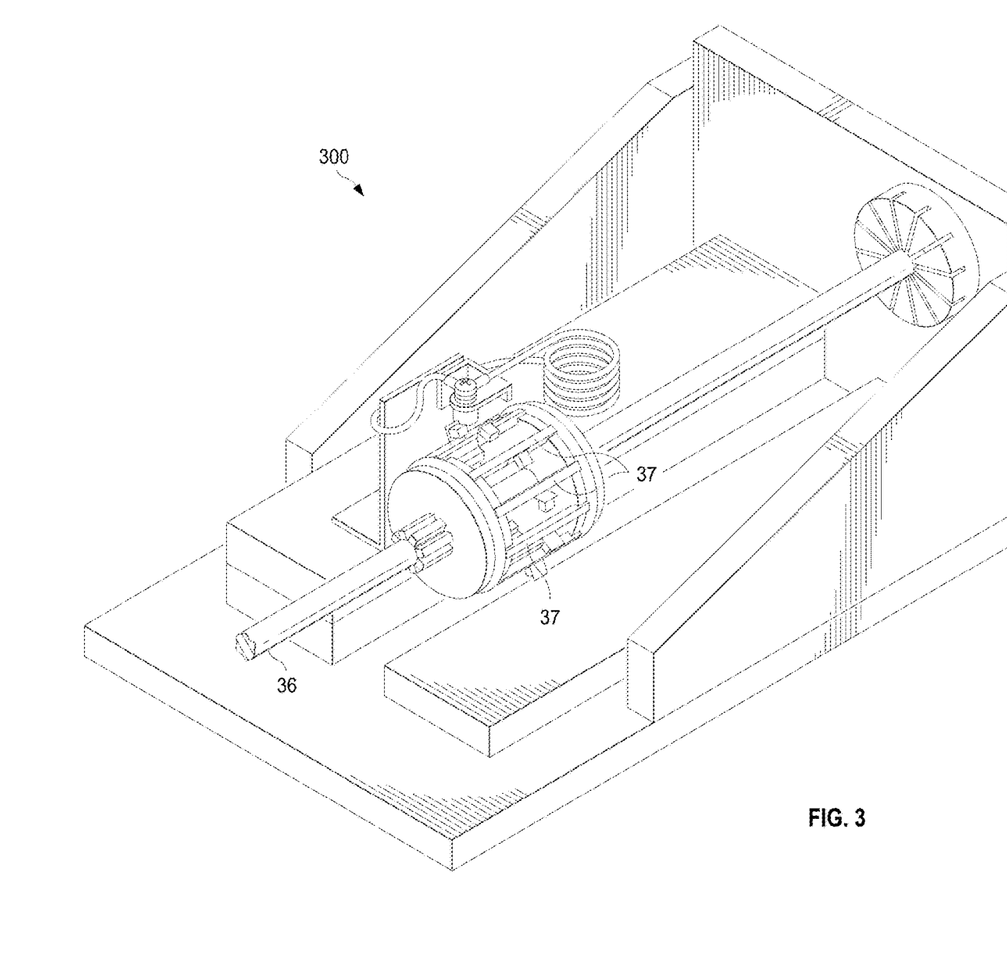
FIG. 3 depicts an example of a multilayer electrode assembly comprising non-uniformly spaced metal layers, in accordance with various aspects of the present disclosure.

Though FIG. 1 depicts uniformly spaced metal and dielectric layers in the y-dimension, other non-uniformly spaced embodiments are possible. FIG. 3 depicts an example of multilayer electrode assembly 300 comprising non-uniformly spaced metal layers 37. In the example depicted in FIG. 3, metal layers 37 are radial plates spaced around dielectric material 36 uniformly in angle, θ, but non-uniformly spaced in the y-dimension. The angular spacing between the metal layers 37 is Δθ. Along the positive y-dimension, the nominal contact positions of the metal layers 37 with the portions of the exterior of dielectric material 36 are given by the following equation:

$$y_n = R_2 \sin(n\Delta\theta) \qquad \text{Eqn. 1}$$

Where $R_2$ is the outer radius of the dielectric tube 36. Note, that nominal contact positions of metal layer 37 are numbered starting with n=0 when the first metal layer is in the x-z plane. However when the x-z plane corresponds to a dielectric layer then the metal layer contact positions are numbered starting with n=1. Unlike the multilayer metal electrode assembly of FIG. 1, for the embodiment shown in FIG. 3, the capacitance between the adjacent metal electrode layers 37 cannot be equal in value and result in a uniform electric field inside the channel formed by dielectric material 36. The capacitances between the metal electrode layers 37 may form a series circuit combination of capacitive reactances, $X_n$. $X_1$ is the capacitive reactance between the metal layer in the x-z plane (n=0) and next metal layer (n=1). All the remaining capacitive reactances may be calculated with the following recursion formula:

$$X_{n+1} = X_n \left( \frac{y_{n+1} - y_n}{y_n - y_{n-1}} \right) \qquad \text{Eqn. 2}$$

An equivalent formula for capacitances is given by:

$$C_{n+1} := C_n \left( \frac{y_n - y_{n-1}}{y_{n+1} - y_n} \right) \qquad \text{Eqn. 3}$$

In multilayer electrode assembly 300, the dielectric layers have been replaced by capacitor devices with values calculated and selected in accordance with Eqn. 3.

When the multilayer metal electrode assembly is operated at the RF frequency, $f_o$, the capacitance values between the metal layers are given by the following equation:

$$C_n = \frac{1}{2\pi f_o X_n} \qquad \text{Eqn. 4}$$

Figure 4A:
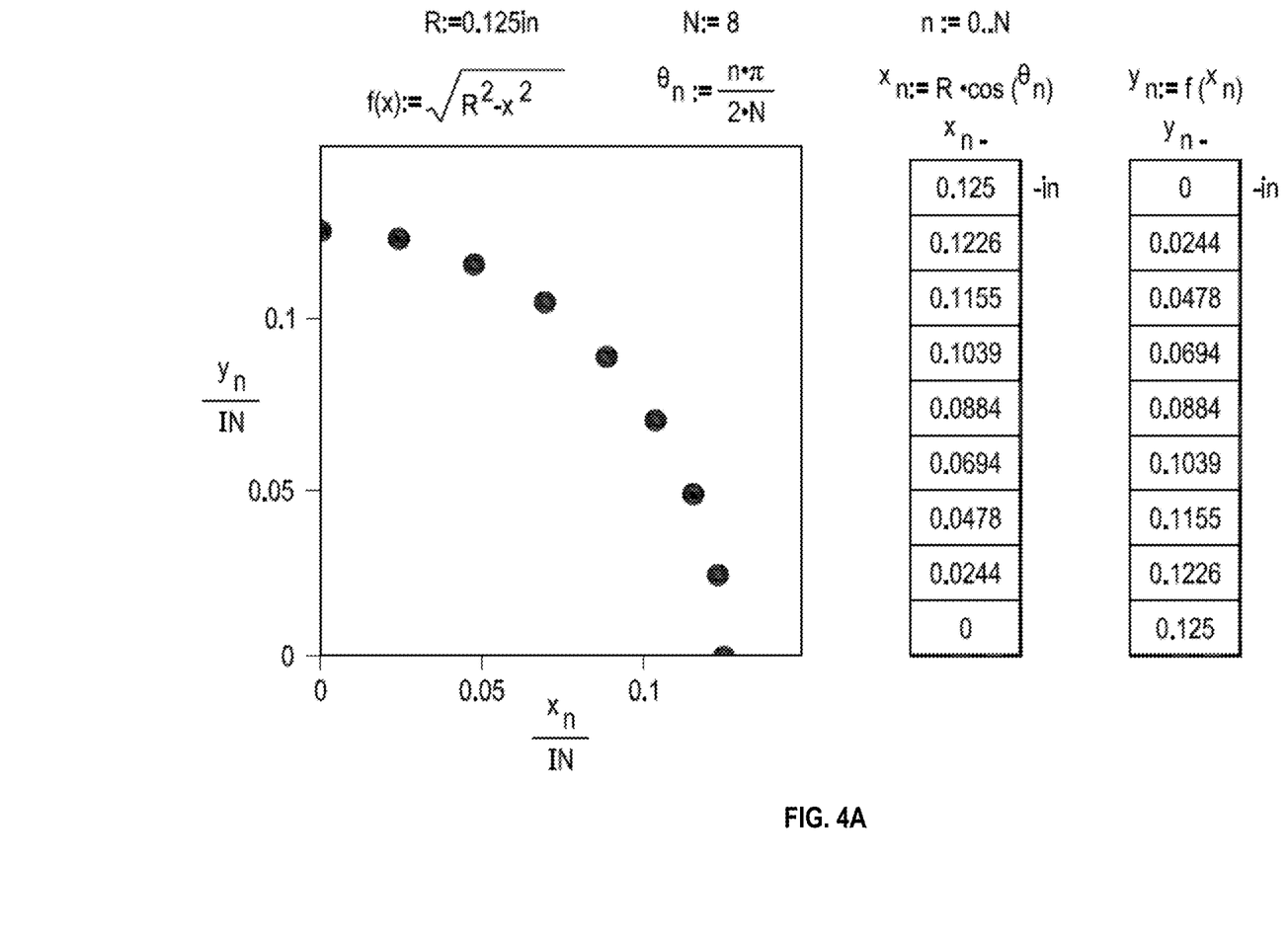
FIGS. 4A-4B depict an example simulation of the distribution of capacitances between metal electrode layers in a multilayer electrode assembly with uniformly-spaced electrodes along the θ coordinate, in accordance with various aspects of the present disclosure.
Figure 4B:
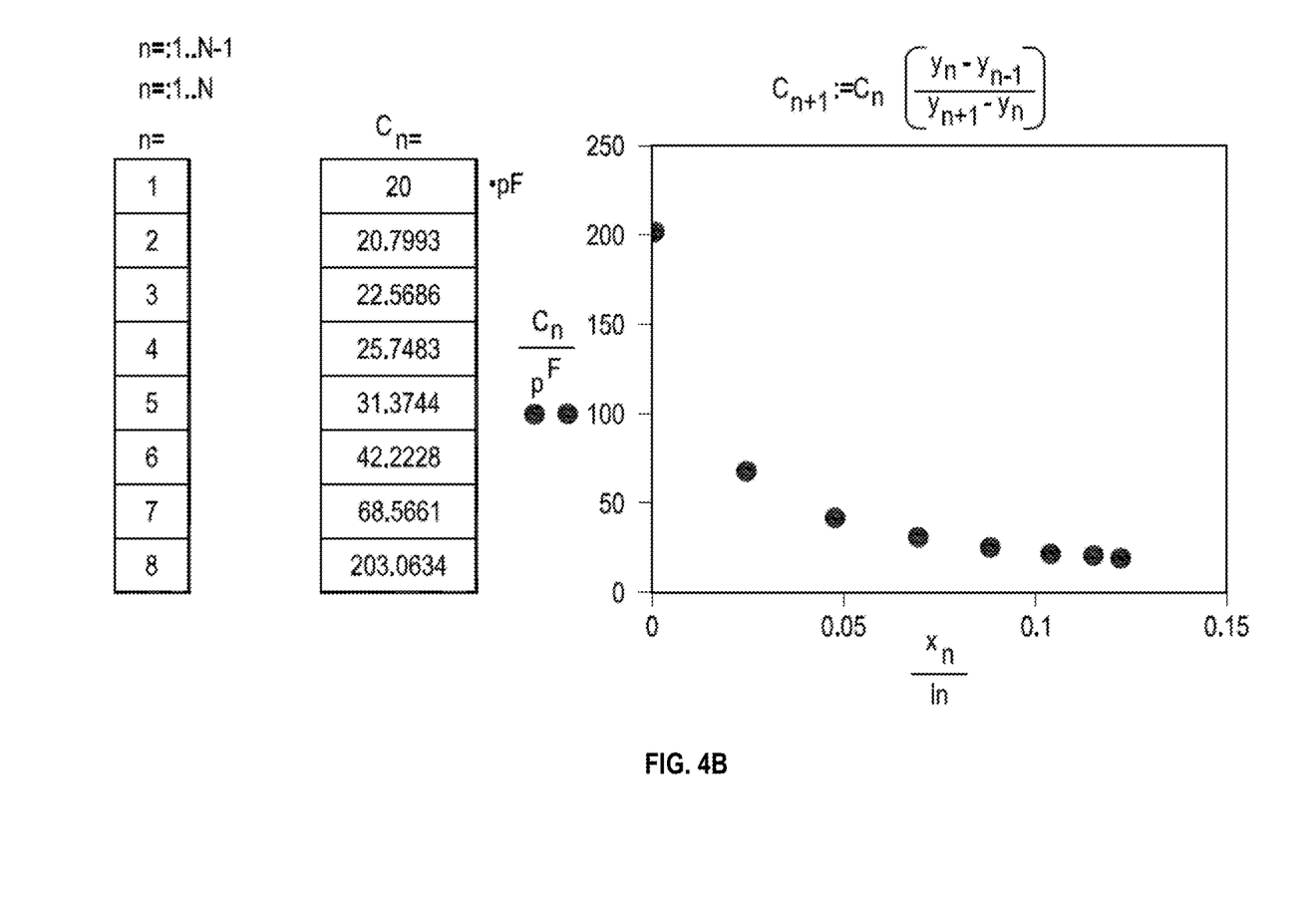

FIGS. 4A-4B depict an example simulation of the distribution of capacitances between metal electrode layers in a multilayer electrode assembly with uniformly-spaced electrodes along the θ coordinate, in accordance with various aspects of the present disclosure. The geometry of the gas discharge region of the multi-layer electrode assembly is specified in the simulation depicted in FIGS. 4A-4B by the function $f(x)$. The value of $f(x)$ determines the y-coordinates for ends of particular electrode layers having coordinates (x, y). Due to quadrilateral symmetry only one quadrant is specified. In the example depicted in FIGS. 4A-4B, $f(x)$, specifies a circular gas discharge bore of radius R (where R is the outer radius of the dielectric tube). The electrode assembly consists of N+1 layers distributed uniformly along the θ-coordinate, similar to the example embodiment depicted in FIG. 3. Note that the index, n, starts at y=0 which is at x=R and counts up to n=N. The x-axis is a bilateral axis of symmetry of the multi-layer electrode assembly and therefore the electrode at x=R is at virtual ground potential. The electrode at x=0 is one of the driven electrodes of the multi-layer electrode assembly.

The radius R is the outer radius of the dielectric tube in the examples shown and described herein. However, in some other examples, the inner radius of the dielectric tube may be used for the various embodiments shown and described herein. In general, the uniformity of the electric field in the discharge bore of the dielectric tube may improve as the inside radius of the tube is made smaller relative to the outside radius of the dielectric tube. Furthermore, the wall thickness of the dielectric tube should generally be no smaller than the spacing between adjacent metal layers in the electrode assembly in order to improve electric field uniformity in the discharge bore of the dielectric tube.

The multi-layer electrode assembly may comprise a pair of electrodes on opposite sides of the assembly (e.g., electrodes 4 depicted in FIG. 1). The electrodes 4 may be driven in at least two ways. In a first example, one electrode 4 may be driven and the opposite electrode may be grounded. In the first example, the electrode assembly may be referred to as an "unbalanced load". In a second example, both electrodes 4 may be driven 180 degrees out of phase with respect to one another and the electrode assembly may be referred to as a "balanced load".

In order to calculate the capacitances, $C_n$, between plates in a multilayer electrode assembly, the value of the first capacitance $C_1$ is chosen. The capacitance $C_1$ is the capacitance between the electrode at ($x_1$, $y_1$) and the electrode at ($x_0$, $y_0$). In the example simulation depicted in FIGS. 4A-4B, $C_1$ has been chosen as 20 pF. Eqn. 3 above is used to calculate the remaining values of $C_n$ that will result in a maximally uniform electric field in the gas discharge region (e.g., the interior of the laser gas channel) of the electrode assembly. As shown in FIG. 4B, as the electrodes are non-uniformly spaced in the y-dimension (e.g., the electrodes in the simulation depicted in FIGS. 4A-4B are uniformly spaced along the θ coordinate) non-uniform capacitances are calculated for the radially-spaced electrodes.

Figure 5A:
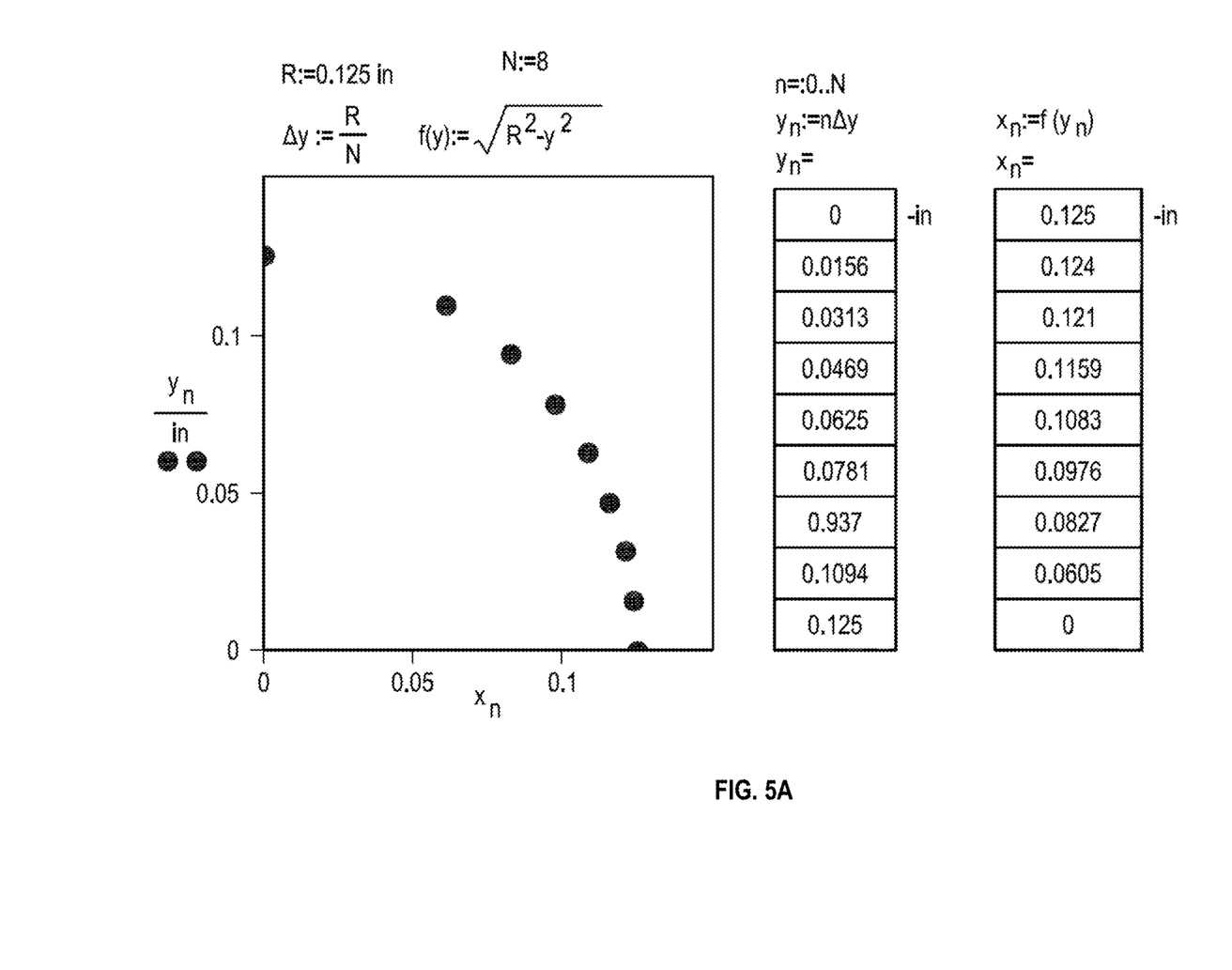
FIGS. 5A-5B depict an example simulation of the distribution of capacitances between metal electrode layers in a multilayer electrode assembly with uniformly-spaced electrodes along the y coordinate, in accordance with various aspects of the present disclosure.
Figure 5B:
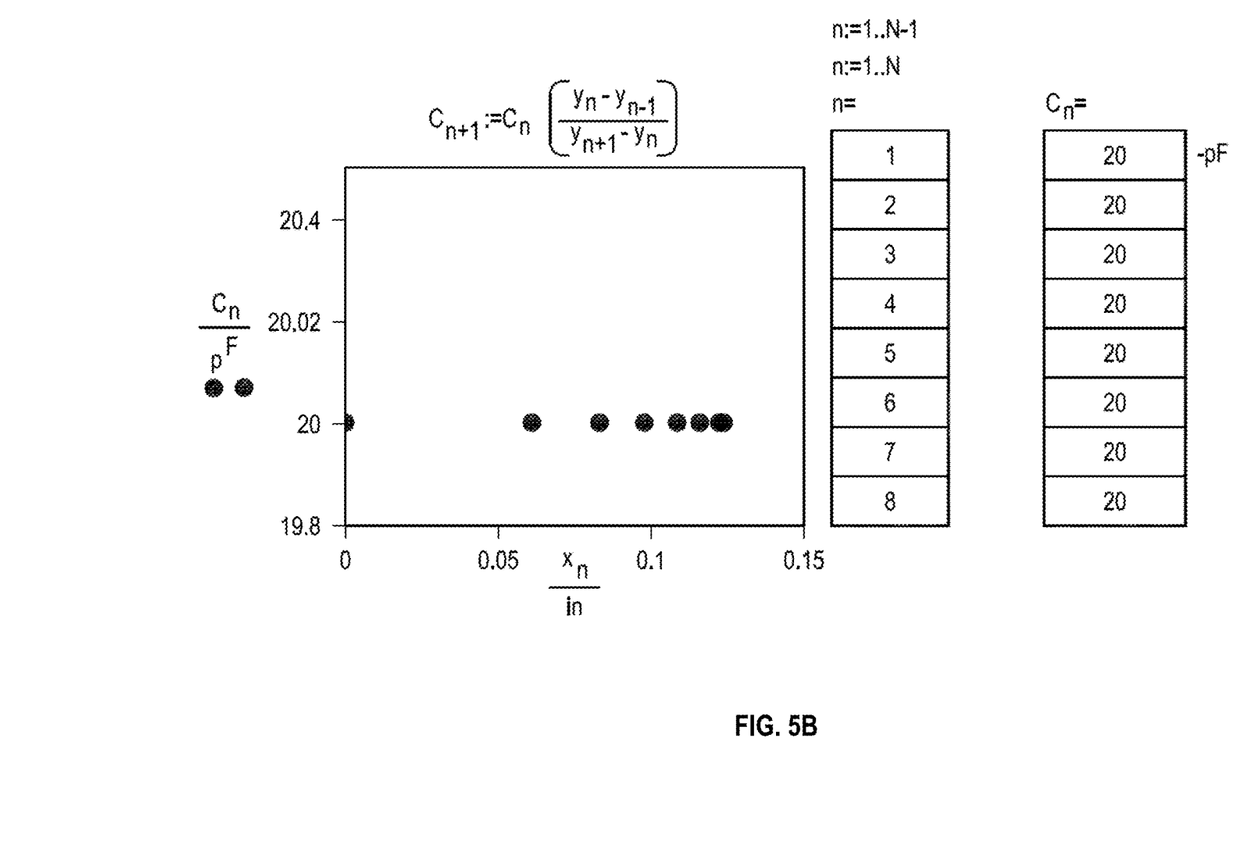

FIGS. 5A-5B depict an example simulation of the distribution of capacitances between metal electrode layers in a multilayer electrode assembly with uniformly-spaced electrodes along the y-coordinate, in accordance with various aspects of the present disclosure. The geometry of the gas discharge region of the multi-layer electrode assembly is specified in the simulation depicted in FIGS. 5A-5B by the function $f(y)$. The value of $f(y)$ determines the x-coordinates for ends of particular electrode layers having coordinates (x, y). Due to quadrilateral symmetry one quadrant need only be specified. In the example depicted in FIGS. 5A-5B, $f(y)$, specifies a circular gas discharge bore of radius R (where R is the outer radius of the dielectric tube). The electrode assembly consists of N+1 layers distributed uniformly along the y-coordinate. Note that the index, n, starts at y=0 which is at x=R and counts up to n=N. The x-axis is a bilateral axis of symmetry of the multi-layer electrode assembly and therefore the electrode at x=R is at virtual ground potential. The electrode at x=0 is one of the driven electrodes of the multi-layer electrode assembly.

In order to calculate the capacitances, $C_n$, between plates in a multilayer electrode assembly, the value of the first capacitance $C_1$ is chosen. The capacitance $C_1$ is the capacitance between the electrode at ($x_1$,$y_1$) and the electrode at ($x_0$,$y_0$). In the example simulation depicted in FIGS. 5A-5B, $C_1$ has been chosen as 20pF. Eqn. 3 above is used to calculate the remaining values of $C_n$ that will result in a maximally uniform electric field in the gas discharge region (e.g., the interior of the laser gas channel) of the electrode assembly. As shown in FIG. 5B, as the electrodes are uniformly spaced in the y-dimension (e.g., the electrodes in the simulation depicted in FIGS. 5A-5B are uniformly spaced along the y coordinate) the capacitances calculated using Eqn. 3 are also uniform.

While various embodiments have been described in terms of particular examples and illustrative figures, those of ordinary skill in the art will recognize that the disclosure is not limited to the embodiments or figures described. For example, in various embodiments described above, the thickness of a particular layer of the multilayer electrode assembly (e.g., the thickness of a dielectric layer and/or a metal layer) may be selected so as to be either uniform or non-uniform with any other layer of the multilayer electrode assembly so long as the capacitance between each metal layer of the multilayer electrode assembly satisfies Eqn 3, above. Additionally, as described above, any number of layers and various types of materials may be used in a multilayer electrode assembly, in accordance with the various aspects of the present disclosure. In at least some examples, the number of and/or thickness of the metal layers may be adjusted in order to achieve a desired thermal conductivity and/or a desired degree of electric field uniformity. Similarly, the dielectric material layers and the thickness of the dielectric material layers may be chosen to achieve a desired thermal conductivity and/or a desired degree of electric field uniformity. In at least some examples where the various layers are non-uniformly spaced in the y-dimension, capacitor devices may be used as the dielectric layers to impart the capacitances between metal layers determined by Eqn. 3 in order to generate a uniform electric field within the laser gas channel (e.g., channel 3 of FIG. 1). Additionally, various multilayer electrode assemblies designed in accordance with the present disclosure may be driven with as few as a single electrode in order to generate uniform electric fields. There is no need to drive multiple different electrodes with multiple different drive signals.

In various examples, the optical mode volume of a high quality gas laser system may benefit from the high degree of electric field uniformity generated by the multilayer electrode assemblies described herein. In some examples, high quality gas laser systems comprising the multilayer electrode assemblies described herein may have applications in dentistry and light detection and ranging (LIDAR). Additionally, the multilayer electrode assemblies described herein may improve the efficiency and functionality of gas lasers generally. In some examples, non-laser applications of the multilayer electrode assemblies described herein may include uniform industrial heating of fluids in, for example, chemical processes and/or other manufacturing.

The particulars shown herein are by way of example and for purposes of illustrative discussion of the embodiments described in the present disclosure only and are presented in the cause of providing what is believed to be the most useful and readily understood description of the principles and conceptual aspects of various embodiments of the disclosure. In this regard, no attempt is made to show details of the disclosure in more detail than is necessary for the fundamental understanding of various embodiments, the description taken with the drawings and/or examples making apparent to those skilled in the art how the several forms of the disclosure may be embodied in practice.

As used herein and unless otherwise indicated, the terms "a" and "an" are taken to mean "one," "at least one" or "one or more." Unless otherwise required by context, singular terms used herein shall include pluralities and plural terms shall include the singular.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While specific embodiments and examples for the disclosure are described herein for illustrative purposes, various equivalent modifications are possible within the scope of the disclosure, as those skilled in the relevant art will recognize. Such modifications may include, but are not limited to, changes in the dimensions and/or the materials shown in the disclosed embodiments.

Specific elements of any embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

Therefore, it should be understood that various embodiments of the disclosure can be practiced with modification and alteration within the spirit and scope of the appended claims. The description is not intended to be exhaustive or to limit the disclosure to the precise form disclosed. It should be understood that various embodiments can be practiced with modification and alteration and that the disclosure be limited only by the claims and the equivalents thereof.

What is claimed is:

1. A multilayer electrode assembly comprising:
    a first dielectric material having an exterior surface and an interior surface, wherein the first dielectric material is shaped so as to form a channel defined by the interior surface; and
    a layered structure comprising:
        a first metal layer disposed adjacent to a first portion of the exterior surface of the first dielectric material; and
        a second metal layer disposed adjacent to a second portion of the exterior surface of the first dielectric material, wherein the first metal layer is disposed in a first spaced relationship with the second metal layer in the layered structure;
    wherein an electric field is generated in the channel of the first dielectric material when a voltage is applied to the multilayer electrode assembly by a drive electrode.

2. The multilayer electrode assembly of claim 1, wherein the electric field generated in the channel of the first dielectric material when the voltage is applied to the multilayer electrode assembly by the drive electrode has a uniformity of at least 80%.

3. The multilayer electrode assembly of claim 1, wherein the electric field generated in the channel of the first dielectric material when the voltage is applied to the multilayer electrode assembly by the drive electrode has a uniformity of at least 90%.

4. The multilayer electrode assembly of claim 1, wherein the electric field generated in the channel of the first dielectric material when the voltage is applied to the multilayer electrode assembly by the drive electrode has a uniformity of at least 95%.

5. The multilayer electrode assembly of claim 1, further comprising:
    a third metal layer disposed adjacent to a third portion of the exterior surface of the first dielectric material, wherein the third metal layer is disposed in a second spaced relationship with the second metal layer;
    a first dielectric layer disposed between the first metal layer and the second metal layer; and
    a second dielectric layer disposed between the second metal layer and the third metal layer.

6. The multilayer electrode assembly of claim 1, wherein the first metal layer is parallel to the second metal layer such that the first metal layer is uniformly spaced from the second metal layer.

7. The multilayer electrode assembly of claim 1, further comprising:
    a third metal layer disposed adjacent to a third portion of the exterior surface of the first dielectric material, wherein the third metal layer is disposed in a second spaced relationship with the second metal layer in the layered structure, wherein the first metal layer is uniformly spaced from the second metal layer and the second metal layer is uniformly spaced from the third metal layer, resulting in a first capacitance between the first metal layer and the second metal layer and a second capacitance between the second metal layer and the third metal layer when the voltage is applied to the multilayer electrode assembly, wherein the first capacitance and the second capacitance are equal to within +/−10%.

8. The multilayer electrode assembly of claim 1, further comprising:
a third metal layer disposed adjacent to a third portion of the exterior surface of the first dielectric material, wherein the third metal layer is disposed in a second spaced relationship with the second metal layer in the layered structure;
wherein:
the first dielectric material is formed into a tube-like shape with a circular or elliptical cross section; and
the first metal layer, the second metal layer, and the third metal layer are arranged radially around the exterior surface of the first dielectric material such that there is an angle θ between the first metal layer and second metal layer and between the second metal layer and the third metal layer in the layered structure.

9. The multilayer electrode assembly of claim 1, wherein a capacitance between the first metal layer and the second metal layer is $C_{n+1}$ when the voltage is applied to the multilayer electrode assembly, where $$C_{n+1} := C_n \left( \frac{y_n - y_{n-1}}{y_{n+1} - y_n} \right),$$

where n represents an index of each metal layer and y represents a position of a particular metal layer on the exterior surface of the first dielectric material.

10. The multilayer electrode assembly of claim 1, further comprising:
a capacitor disposed between and electrically coupled to the first metal layer and the second metal layer, wherein a capacitance of the capacitor is $C_{n+1}$, where $$C_{n+1} := C_n \left( \frac{y_n - y_{n-1}}{y_{n+1} - y_n} \right),$$

where n represents an index of each metal layer and y represents a position of a particular metal layer on the exterior surface of the first dielectric material.

11. The multilayer electrode assembly of claim 1, wherein:
the first dielectric material is formed into a tube-like shape with a circular or elliptical cross section; and
a first length of the first metal layer in a first direction extending away from the first portion of the exterior surface is approximately equal to a second length of the second metal layer in the first direction extending away from the second portion of the exterior surface, wherein a first distal end of the first metal layer extends further from a center point of the channel relative to a second distal end of the second metal layer.

12. A laser system comprising:
a power source;
a drive electrode configured in electrical communication with the power source;
a dielectric tube having an exterior surface and an interior surface, wherein the dielectric tube is shaped so as to form a channel defined by the interior surface;
a mirror mount positioned at an end of the dielectric tube; and
a layered structure comprising:
a first metal layer disposed adjacent to a first portion of the exterior surface of the dielectric tube; and
a second metal layer disposed adjacent to a second portion of the exterior surface of the dielectric tube, wherein the first metal layer is disposed in a first spaced relationship with the second metal layer in the layered structure;
wherein an electric field with a uniformity of greater than 85% is generated in the channel of the dielectric tube when a voltage is applied to the drive electrode by the power source.

13. The laser system of claim 12, further comprising:
a third metal layer disposed adjacent to a third portion of the exterior surface of the dielectric tube, wherein the third metal layer is disposed in a second spaced relationship with the second metal layer in the layered structure;
a first dielectric layer disposed between the first metal layer and the second metal layer; and
a second dielectric layer disposed between the second metal layer and the third metal layer.

14. The laser system of claim 12, wherein the first metal layer is parallel to the second metal layer such that the first metal layer is uniformly spaced from the second metal layer in the layered structure.

15. The laser system of claim 12, further comprising:
a third metal layer disposed adjacent to a third portion of the exterior surface of the dielectric tube, wherein the third metal layer is disposed in a second spaced relationship with the second metal layer in the layered structure, wherein the first metal layer is uniformly spaced from the second metal layer and the second metal layer is uniformly spaced from the third metal layer in the layered structure, resulting in a first capacitance between the first metal layer and the second metal layer and a second capacitance between the second metal layer and the third metal layer when the voltage is applied to the drive electrode, wherein the first capacitance and the second capacitance are equal to within +/−10%.

16. The laser system of claim 12, further comprising:
a third metal layer disposed adjacent to a third portion of the exterior surface of the dielectric tube, wherein the third metal layer is disposed in a second spaced relationship with the second metal layer in the layered structure;
wherein:
the dielectric tube comprises a circular or elliptical cross section; and
the first metal layer, the second metal layer, and the third metal layer are arranged radially around the exterior surface of the dielectric tube such that there is an angle θ between the first metal layer and second metal layer and between the second metal layer and the third metal layer in the layered structure.

17. The laser system of claim 12, wherein a capacitance between the first metal layer and the second metal layer is $C_{n+1}$ when the voltage is applied to the laser system, where $$C_{n+1} := C_n \left( \frac{y_n - y_{n-1}}{y_{n+1} - y_n} \right),$$

where n represents an index of each metal layer and y represents a position of a particular metal layer on the exterior surface of the dielectric tube.

18. The laser system of claim 12, further comprising:
a capacitor disposed between and electrically coupled to the first metal layer and the second metal layer, wherein a capacitance of the capacitor is $C_{n+1}$, where $$C_{n+1} := C_n \left( \frac{y_n - y_{n-1}}{y_{n+1} - y_n} \right),$$

where n represents an index of each metal layer and y represents a position of a particular metal layer on the exterior surface of the dielectric tube.

19. The laser system of claim 12, wherein:
the dielectric tube comprises a circular or elliptical cross section; and
a first length of the first metal layer in a first direction extending away from the first portion of the exterior surface is approximately equal to a second length of the second metal layer in the first direction extending away from the second portion of the exterior surface, wherein a first distal end of the first metal layer extends further from a center point of the channel relative to a second distal end of the second metal layer.

20. A method of generating an electric field, comprising:
applying a voltage to a drive electrode of a multilayer electrode assembly, wherein the multilayer electrode assembly comprises:
a first dielectric material having an exterior surface and an interior surface, wherein the first dielectric material is shaped so as to form a channel defined by the interior surface; and
a layered structure comprising:
a first metal layer disposed adjacent to a first portion of the exterior surface of the first dielectric material;
a second metal layer disposed adjacent to a second portion of the exterior surface of the first dielectric material, wherein the first metal layer is disposed in a first spaced relationship with the second metal layer in the layered structure; and
a third metal layer disposed adjacent to a third portion of the exterior surface of the first dielectric material, wherein the third metal layer is disposed in a second spaced relationship with the second metal layer in the layered structure, wherein the voltage is effective to produce a first capacitance between the first metal layer and the second metal layer and a second capacitance between the second metal layer and the third metal layer.

21. The method of claim 20, wherein the first capacitance and the second capacitance are equal to within +/−10%.

22. The method of claim 20, further comprising:
pumping a gas into the channel of the first dielectric material such that a pressure inside the channel is between about 10 and 300 torr; and
emitting a continuous wave laser from the channel.

23. The method of claim 20, further comprising:
pumping a gas into the channel of the first dielectric material such that a pressure inside the channel is between about 300 and 760 torr; and
emitting a pulsed laser from the channel.

24. The multilayer electrode assembly of claim 1, wherein:
the first metal layer comprises a first metal plate in the layered structure; and
the second metal layer comprises a second metal plate in the layered structure.

* * * * *